United States Patent [19]

Houston et al.

[11] Patent Number: 5,249,392
[45] Date of Patent: Oct. 5, 1993

[54] APPARATUS FOR OPENING AND CLOSING A CHAMBER DOOR

[75] Inventors: John C. Houston; Arthur T. Nagare, both of Erie, Pa.

[73] Assignee: American Sterilizer Company, Erie, Pa.

[21] Appl. No.: 861,731

[22] Filed: Apr. 1, 1992

[51] Int. Cl.⁵ .............................................. E05F 11/00
[52] U.S. Cl. ........................................................ 49/360
[58] Field of Search ........................ 49/360, 324, 13, 14

[56] References Cited

U.S. PATENT DOCUMENTS

| | | | |
|---|---|---|---|
| 1,358,859 | 11/1920 | Leach . | |
| 2,007,552 | 7/1935 | Vetterlein | 189/60 |
| 2,222,151 | 11/1940 | Morgan | 268/30 |
| 2,874,422 | 2/1959 | Fentiman | 20/19 |
| 3,821,865 | 7/1974 | Steinke | 49/360 X |
| 4,840,080 | 6/1989 | Kobayashi et al. | 49/360 X |
| 5,072,544 | 12/1991 | Breck, Jr. | 49/360 X |

Primary Examiner—Philip C. Kannan
Attorney, Agent, or Firm—Jones, Day, Reavis & Pogue

[57] ABSTRACT

An apparatus for moving a chamber door between open and closed positions relative to the opening in a sterilizer or an autoclave chamber. The apparatus is adapted to be used with a door system wherein the door is slidably attached to the chamber by support brackets that are affixed to the end of the chamber. A first set of pulleys are attached to the lower corners of the door and a second set of pulleys, arranged perpendicular to and directly above the first pulleys, are attached to the chamber. A cable, having one end thereof attached to a motorized take-up drum that is attached to the chamber, is received on the first and second pulleys so that the door is suspended on two sides by the cable. The pulley and cable arrangement supports and controls the vertical movement of the door without interfering with the support brackets that are affixed to the chamber. The other end of the cable is attached to a weight for creating tension in the cable.

8 Claims, 4 Drawing Sheets

APPARATUS FOR OPENING AND CLOSING A CHAMBER DOOR

BACKGROUND OF THE INVENTION

1. Field of the Invention

The invention relates to apparatus for opening and closing doors and, in particular, to apparatus for opening and closing doors on autoclave and sterilizer chambers.

2. Description of the Invention Background

Sterilizers and autoclaves are known in the art and are generally used in hospitals, industrial laboratories and other facilities for the purpose of sterilizing various solid, porous, and liquid articles. Typically, the sterilizer or autoclave chamber is located in a wall between a controlled environment room such as a laboratory or an operating room and an adjacent room wherein the strict environmental controls and parameters are not maintained.

Vertically sliding doors are typically used in connection with such machines because they require a minimum of space in relation to the size of the opening they provide and they do not interfere with the loading and unloading of the machine. Such vertically sliding doors can be controlled by motor-controlled cables which serve to move the door between open and closed positions. Those cable controlled doors, however, have a number of disadvantages.

For example, the cable controlled chamber doors, due to the routing and location of the cables, generally require large gear motors to control the cables. Because sterilizers have a substantial amount of piping and valves associated therewith, the large gear motor is typically surrounded by piping and plumbing fixtures that make it difficult to service the gear motor. In addition, the cables normally associated with those doors typically consist of braided wire which is difficult to adequately clean. Because the cable is difficult to clean and typically routed in close proximity to the sterilizer opening, the likelihood of contacting the cable and thus contaminating the sterile articles as they are being unloaded from the sterilizer is increased.

Thus the need exists for a cable controlled door arrangement for opening and closing chamber doors wherein smaller gear motors may be used and wherein the cable and pulleys do not interfere with the loading and unloading of the sterilizer chamber. The need also exists for a cable and pulley controlled autoclave and sterilizer door system that is conducive to the cleaning procedures and requirements commonly associated with environmentally controlled rooms. There is a further need for a cable controlled door system for autoclaves and sterilizers wherein smaller gear motors may be used.

SUMMARY OF THE INVENTION

The present invention comprises a motorized cable and pulley system used to move a chamber door between opened and closed positions relative to an opening in a sterilizer or autoclave chamber. The apparatus of the present invention is adapted to be used on sterilizer and autoclave door systems wherein the door is slidably attached to the end of the chamber. However, the present invention may also be used to control other doors and like members that require movement between different positions.

The present invention can comprise a first pair of pulleys that are rotatably fastened to the lower two corners of the chamber door. The first pair of pulleys are fastened to the door via corresponding bracket members that properly orient the pulleys so they avoid contacting the support brackets and sealing hardware as the door slides therein. A second pair of pulleys are rotatably fastened to the upper portion of the chamber so that the cable can be routed across the top of the chamber opening without interfering with the door support and sealing hardware.

One end of the cable is fastened to a take-up drum that is rotatably fastened to the chamber and is controlled by a reversible gear motor. The other end of the cable is fastened to a weight member that serves to keep the cable taut. In preferred form, that weight member arrangement is disclosed in U.S. patent application Ser. No. 848,805, entitled "Apparatus For Eliminating Slack in Motorized Cables", the disclosure of which is herein incorporated by reference. The door is caused to slide vertically to a closed position by winding the cable onto the take-up drum. Conversely, the door may be lowered to an open position by unwinding the cable from the take-up drum until the door reaches a fully opened position. The portion of cable that extends between the take-up drum and the weight is received on the above-described collection of pulleys such that the door is supported on two sides by the cable without the cable being routed across the front of the door or under the door. Such pulley and cable arrangement also provides a mechanical advantage over the prior cable systems so that a significantly smaller gear motor may be used.

Accordingly, the present invention provides solutions to the aforementioned problems encountered when using motorized cables for controlling the opening and closing of autoclave and sterilizer doors. The present invention permits the cable to be freely collected on the take-up drum and unwound therefrom unimpeded by the support brackets and sealing hardware that is attached to the end of the chamber. The present invention also provides a significant mechanical advantage over the prior cable and pulley arrangements and, as such, a smaller gear motor may be employed. These and other details, objects and advantages of the invention will become apparent as the detailed description of the present invention proceeds.

BRIEF DESCRIPTION OF THE DRAWINGS

The preferred embodiment of the invention will now be described by way of example only, with reference to the accompanying Figures wherein like members bear like reference numerals and wherein.

DETAILED DESCRIPTION OF THE PREFERRED EMBODIMENT

Figure 1:
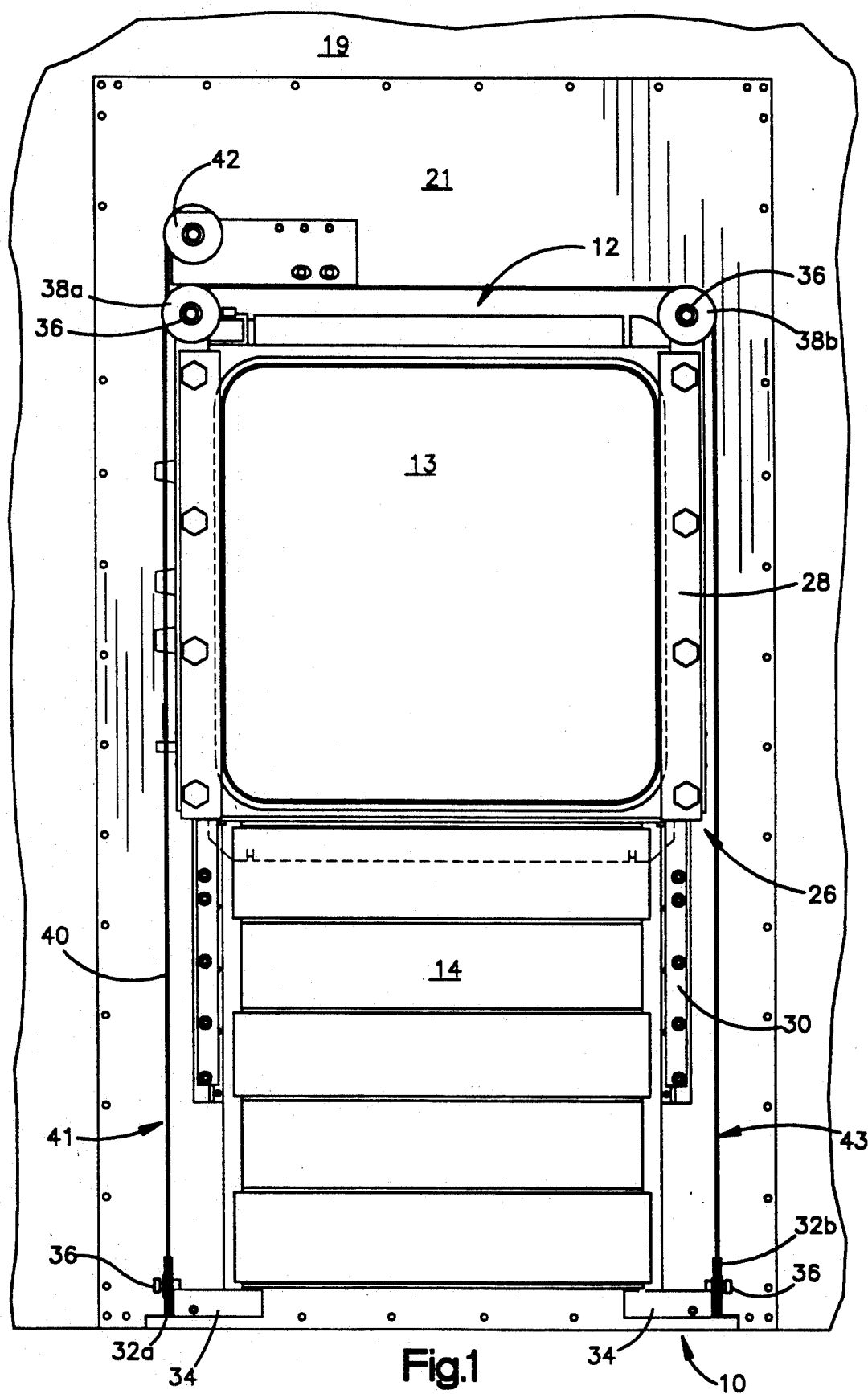
FIG. 1 is a front elevational view of the preferred embodiment of the cable and pulley system of the present invention connected to a sterilizer door system.

Referring now to the drawings which are for purposes of illustrating the preferred embodiment of the present invention only and not for purposes of limiting the same, the Figures show a cable and pulley system generally designated as 10, adapted to open and close the door 14 of a conventional sterilizer 12. The skilled artisan, will appreciate, however, that the present invention may be used to control other doors and similarly constructed members.

Figure 2:
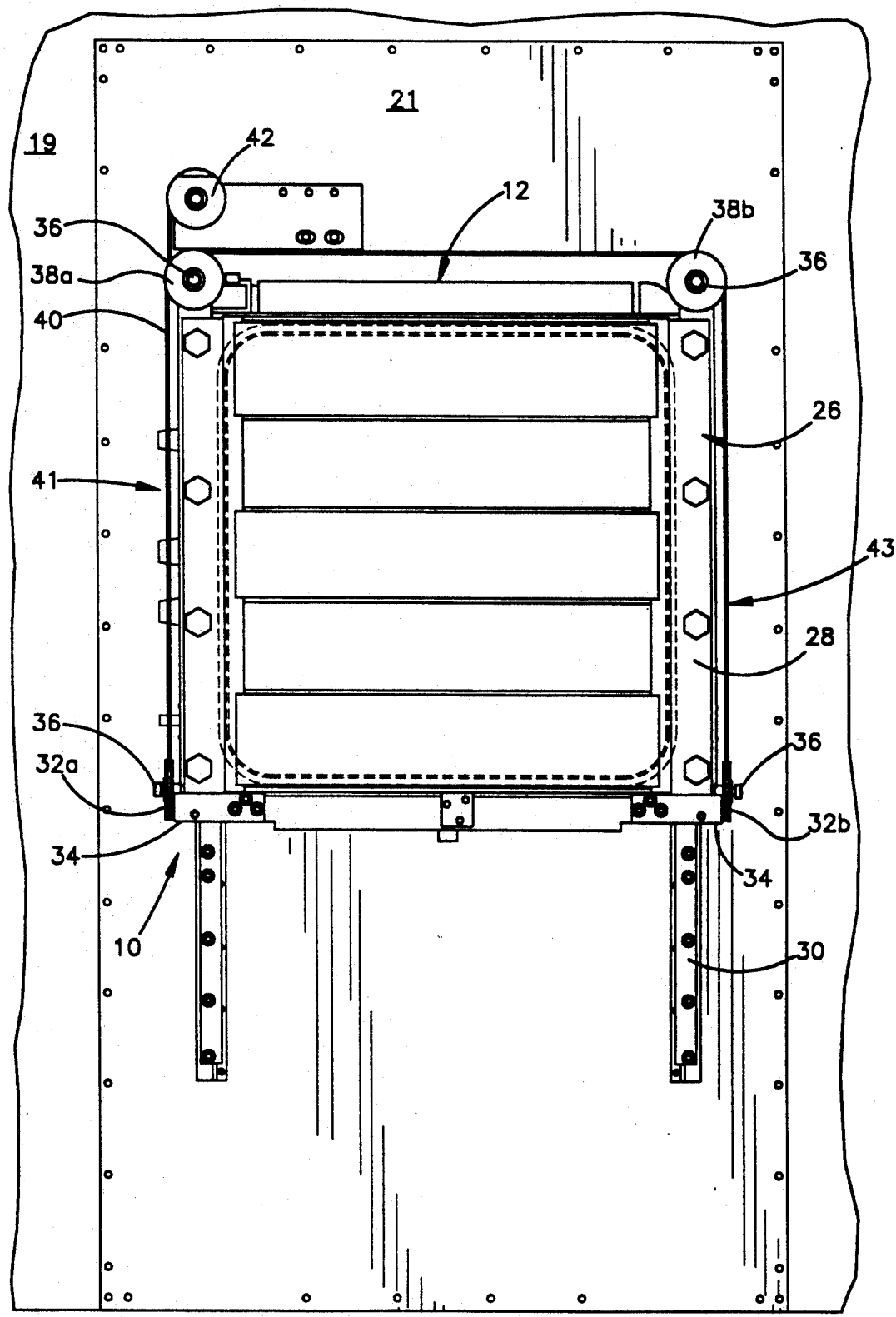
FIG. 2 is a front elevational view of the preferred embodiment of the cable and pulley system of the present invention connected to a sterilizer door system.

More particularly and with reference to FIGS. 1 and 2, the sterilizer 12 is exemplary of typical sterilizers having vertically sliding doors, the construction and operation of which are known in the art. As such, a detailed description of the sterilizer 12 need not be set forth herein beyond that which is necessary to understand the present invention.

Figure 3:
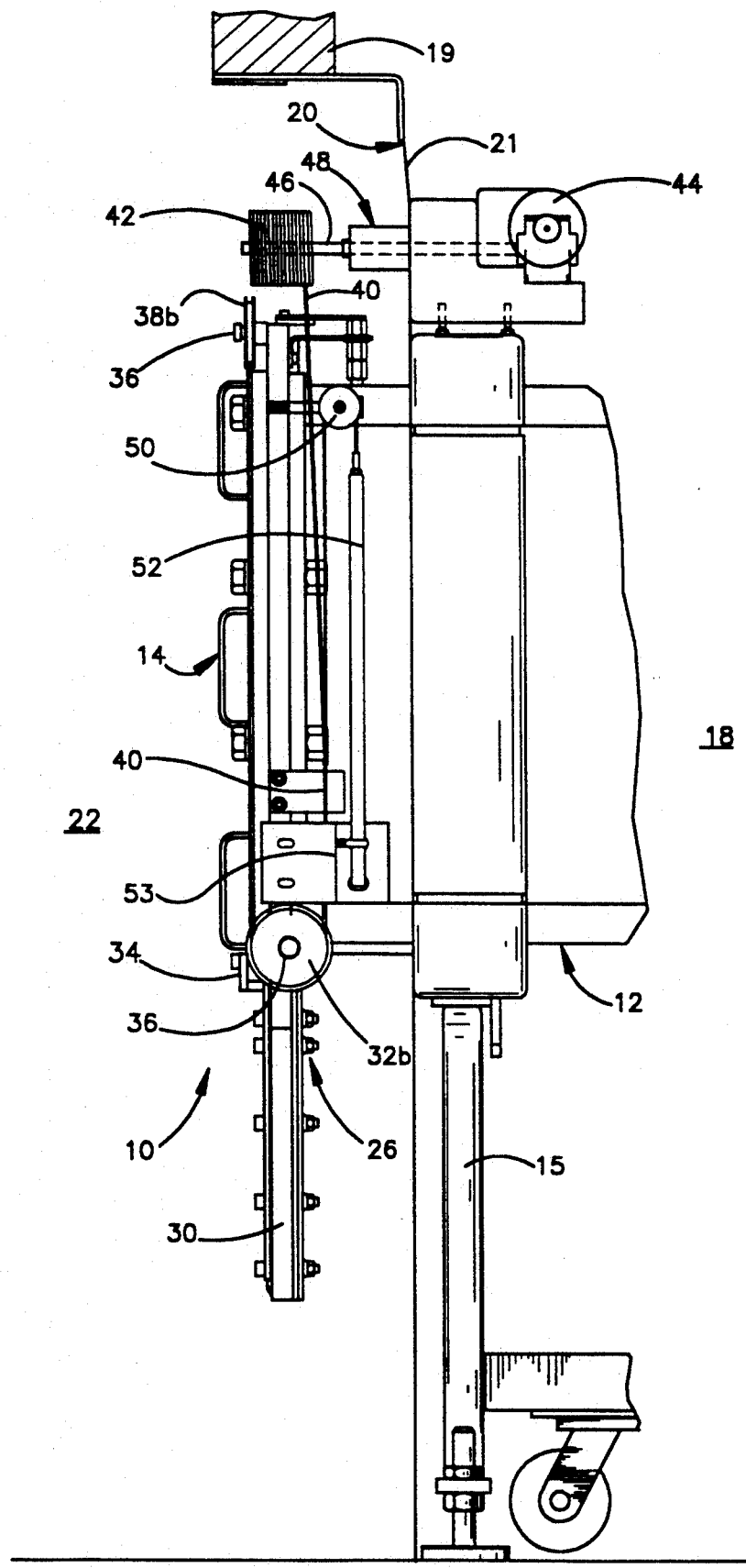
FIG. 3 is a side elevational view of the cable and pulley system of the present invention.

As particularly shown in FIG. 3, the sterilizer 12, having a vertically slidable door 14 attached thereto, is supported above the floor level by a stand member 15. The sterilizer 12 is typically located in a non-environmentally controlled room generally designated as 18 and is arranged to be accessed from an adjacent environmentally controlled or "clean" room 22, such as, for example, a controlled laboratory environment. It will be appreciated, however, that the sterilizer 12 may also be equipped with a second access door (not shown) in its opposite end that may be accessed from the room 18. It will be further appreciated that the present invention may also be installed on that end of the sterilizer to control the corresponding chamber door.

In the preferred embodiment, the sterilizer 12 is arranged so that the opening 13 of the sterilizer 12 and the door 14 are located within clean room 22 while the remainder of the sterilizer 12 is located in the adjacent "non-clean" room 18. A portion of the sterilizer 12 preferably extends through an opening 20 in the wall 19 that separates room 18 from room 22. A sealing flange 21, preferably fabricated from an elastomeric material, is located in the opening 20 and serves to provide an air tight seal around the sterilizer 12. The skilled artisan will appreciate that the sealing flange 21 may be fabricated from a variety of other materials such as, for example, steel or aluminum.

Referring now to FIGS. 1 and 2, the sterilizer door 14 is preferably slidably attached to the open end of the sterilizer 12 by door retainer hardware generally designated as 26. More specifically, in the preferred embodiment, the door retainer hardware 26 consists of "U" shaped upper guide members 28 and "U" shaped lower guide members 30 that are attached to the end of the sterilizer 12 on each side of the opening 13 to provide a vertical way system wherein the door 14 is free to slide vertically between an open position (See FIG. 1) and a closed position (See FIG. 2).

The pulley and cable apparatus 10 of the present invention is adapted to move the door 14 between open and closed positions without interfering with the door retainer hardware 26. In the preferred embodiment, the present invention uses a pair of conventional pulleys 32a and 32b that are rotatably fastened to the lower corners of the door 14 and are adapted to receive a cable 40. It will be appreciated that pulleys 32a and 32b consist of conventional pulleys that have a cable receiving groove therein. It will be apparent to those of ordinary skill in the art, however, that the present invention may also be practiced with a variety of other flexible members such as, for example, chains or ropes that are received on corresponding support members such as sprockets and pulleys without departing from the principle and scope of the present invention.

As can be seen in FIG. 1, pulleys 32a and 32b are fastened to the lower corners of the door 14 by outwardly extending bracket members 34 that are preferably bolted to the door 14. The bracket members 34 orient the corresponding pulleys 32a and 32b so that they do not interfere with the lower support members 30 when the door is vertically received therein. It will be further appreciated that pulleys 32a and 32b each preferably have a bearing member (not shown) centrally disposed therein that is adapted to rotatably receive a bolt or other fastening member that is attached to one of the bracket members 34. In the preferred embodiment, the pulleys 32a and 32b are rotatably fastened to the bracket members 34 by bolts 36.

Figure 4:
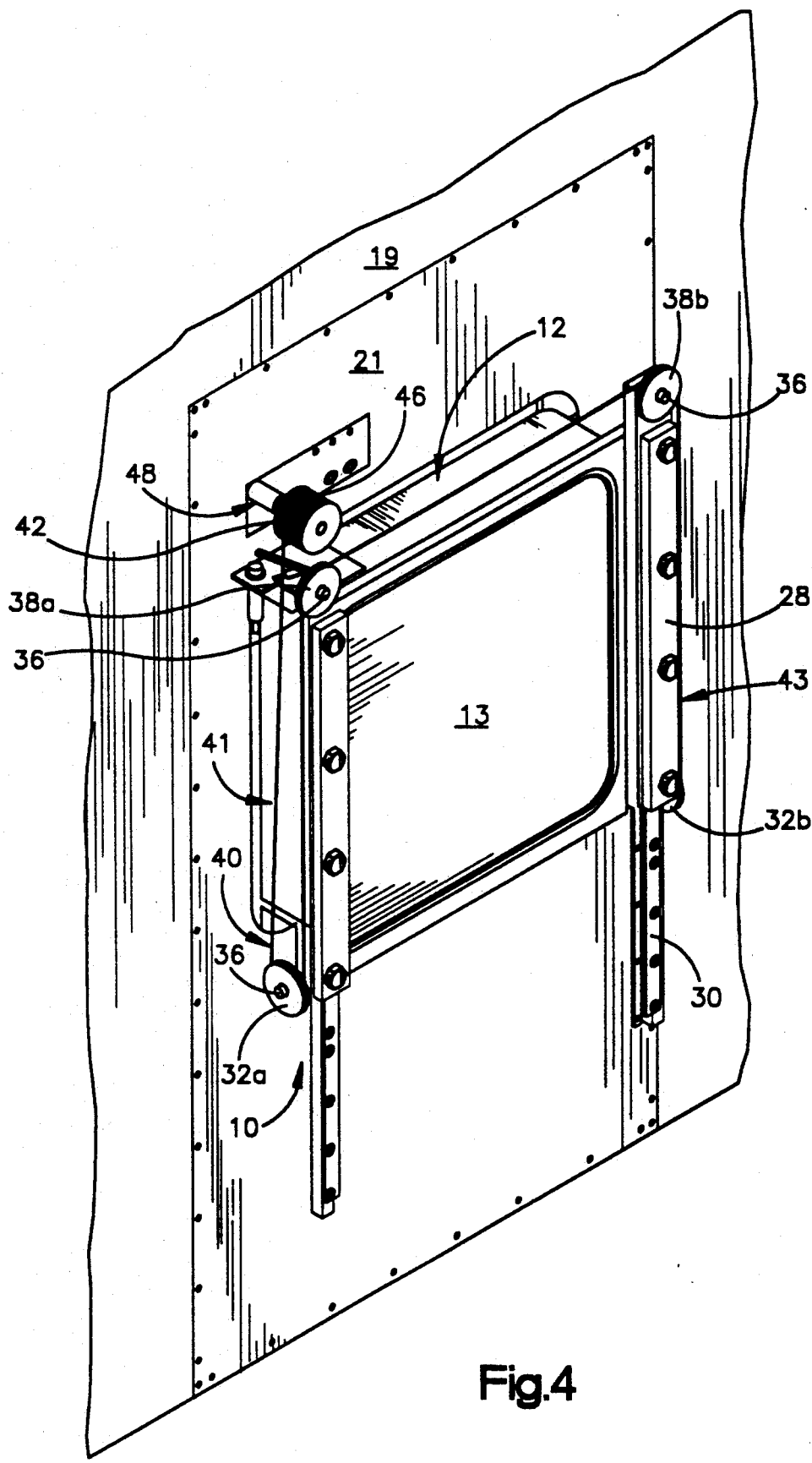
FIG. 4 is an isometric view of the cable and pulley system of the present invention showing the location of the pulleys and cable of the present invention with the door member omitted.

A second pair of conventional pulleys 38a and 38b are rotatably attached to the upper guide members 28 and are arranged so that their grooves are perpendicular and plumb with respect to the grooves in pulleys 32a and 32b. As shown in FIGS. 1, 2, and 4, pulleys 38a and 38b serve to route the cable 40 across and above the opening 13 in the sterilizer 12. As can be further seen in FIGS. 1, 2, and 3, pulley 38a is located directly above pulley 32a so that the cable 40 may extend therebetween to provide a support loop, generally designated as 41 for that side of the door 14. Similarly, pulley 38b is located directly above pulley 32b so that the cable 40 may extend therebetween to provide a support loop, generally designated as 43, to support that side of the door member 14.

The cable 40 is received on the above-mentioned collection of pulleys so that it fully supports and controls the vertical movement of the door 14 as it slides within the upper guide members 28 and lower guide members 30. In particular, the one end of the cable 40 is attached to a take-up drum 42, preferably having helical cable receiving grooves therein, that is positioned directly above the pulley 32a such that the helical grooves are perpendicular and plumb with respect to the groove located in pulley 32a. Those of ordinary skill in the art will appreciate, however, that the take-up drum 42 may alternatively be provided without helical grooves and may be adapted to wind the cable 40 back onto itself as it is collected on the take-up drum 42.

The take-up drum 42 is preferably rotatably fastened to the extended shaft 46 of a reversible gear motor 44. It will be understood that the reversible gear motor 44 supplies the rotational motion necessary to wind the cable 40 onto the take-up drum 42. As shown in FIG. 3, the gear motor 44 is mounted to the portion of the sterilizer 12 that is located in the non-environmentally controlled room 18. As can be further seen in FIG. 3, the extended shaft 46 extends through the sealing flange 21 to be connected to the take-up drum 42. Appropriate commercially available bearing support and sealing means, generally designated as 48, is attached to the sealing flange 21 to support the shaft 46 as it extends through the sealing flange 21 and to provide an airtight seal therebetween. It is perceived that the above-mentioned arrangement will assist in keeping the room 22 cleaner, as all of the maintenance associated with the gear motor 44 may be performed in the room 18.

As was discussed above, one end of the cable 40 is attached to the take-up drum 42. From there, the cable 40 is first received on the lower pulley 32a. The cable 40 then extends upward to be received first on the pulley 38a and from there, the cable 40 extends above and across the opening 13 of the sterilizer 12 to be received on the pulley 38b as shown in FIGS. 1 and 2. Thereafter, the cable 40 extends downward to be received on the pulley 32b and then extends back up again to be received on a pulley 50 that is rotatably fastened to the sterilizer 12 (See FIG. 3). The end of the cable 40 is preferably fastened to a weight 52 that serves to keep the cable 40 taut on the above-mentioned collection of pulleys. As can further be seen in FIG. 3, the weight 52 is slidably received in a hollow clamp member 53 that is attached to the side of the sterilizer 12.

It will be understood that the cable and pulley apparatus 10 of the present invention, when arranged as described above, serves to support the door 14 on two sides within the upper and lower guide members 28 and 30 without the cable 40 extending under or across the face of the door 14. In addition, the present pulley and cable arrangement can provide a 4:1 mechanical advantage which is more than the mechanical advantages achieved by the prior cable arrangements used to control chamber doors. As such, the present invention enables a much smaller gear motor to be used, thus reducing the overall cost of the sterilizer system. Also, because the present invention enables the gear motor 44 to be located outside of the clean room 22, the maintenance operations associated with the gear motor 44, such as filling the gear box with oil, do not hinder the maintenance of the environmentally controlled room. Further, because the above described system utilizes a smaller gear motor, additional space is achieved for accommodating the maintenance operations associated with the gear motor and for routing the many pipes and plumbing fixtures normally associated with the sterilizer 12.

As such, the present invention addresses the various problems encountered when using prior cable and pulley systems for controlling chamber doors. However, it will be appreciated that various changes in the details, materials and arrangements of parts which have been herein described and illustrated in order to explain the nature of the invention, may be made by those skilled in the art within the principle and scope of the invention as expressed in the appended claims.

What is claimed is:

1. An apparatus for moving a door of a chamber between open and closed positions relative to a chamber opening comprising:

mounting means suspended from said chamber, said mounting means slidably attaching said door to said chamber;

a flexible member adapted to movably support said door thereon and having a first end and a second end;

a first means for applying force to said first end of said flexible member which is effective for vertically lowering said door into said open position and vertically raising to said closed position, said first force applying means being attached to said chamber;

a second means for applying a force to said second end of said flexible member;

at least one first support means for receiving said flexible member thereon, said first support means being attached to said door; and at least one second support means for receiving said flexible member thereon, said second support means being attached to said chamber such that said flexible member extends between said first and said second support means to supportingly engage said door along its periphery such that said door is suspended on said flexible member whereby said flexible member does not cross in front of the opening plane of the door during opening.

2. The apparatus recited in claim 1 wherein said flexible member is received on said first and second support means such that said flexible member does not extend under said door.

3. The apparatus recited in claim 1 wherein said flexible member is a cable.

4. The apparatus recited in claim 1 wherein said first and second support means comprise pulleys.

5. The apparatus recited in claim 1 wherein said first support means comprises at least two primary pulleys, each of said primary pulleys being rotatably fastened to either respective side of said door and having a cable receiving groove therein and wherein said second support means comprises at least two secondary pulleys, each placed to correspond to either respective primary pulleys, said secondary pulleys being rotatably fastened to said chamber and having a cable receiving groove therein.

6. The apparatus recited in claim 5 wherein said door has two opposing bottom brackets and each said bottom bracket has one of said primary pulleys rotatably fastened thereto and said chamber has opposing sides and each opposing side has one of said secondary pulleys rotatably fastened thereto above said primary pulleys to which said secondary pulley corresponds, each said secondary pulley being fastened to said chamber such that said cable receiving groove therein is substantially perpendicular to said cable receiving groove in said corresponding primary pulley, said cable being received on said primary and secondary pulleys to supportingly engage said door on at least two sides such that said cable does not interfere with said means for slidably attaching said door to said chamber.

7. The apparatus recited in claim 1 wherein said first means for applying force to said first end of said flexible member is a motorized take-up drum.

8. The apparatus recited in claim 7 wherein said motorized take-up drum has helical cable receiving grooves therein.

* * * * *